July 30, 1940.  F. P. RIEDEL  2,209,663
CONTAINER
Filed June 17, 1938
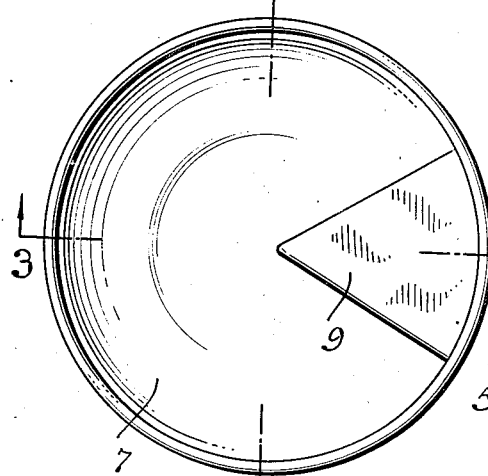
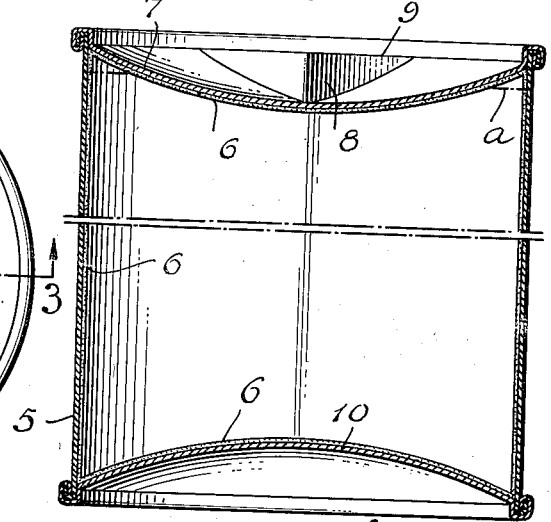
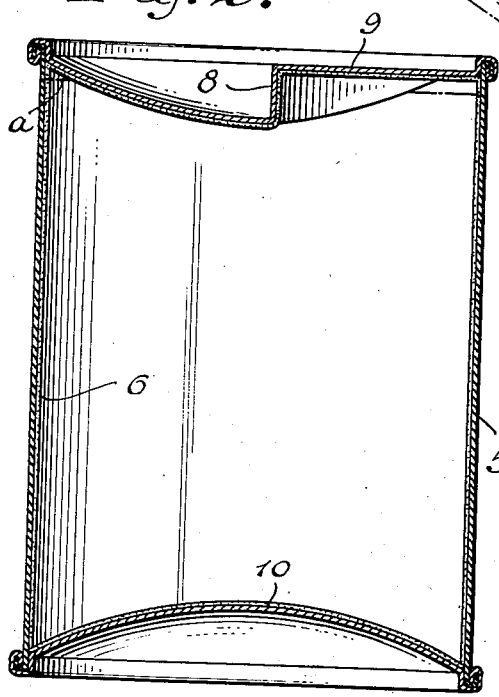
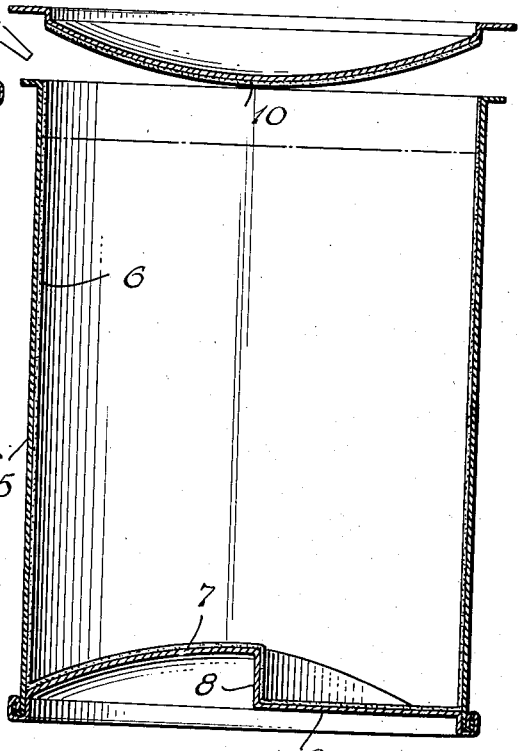
INVENTOR.
FREDERICK P. RIEDEL
BY
ATTORNEY.

Patented July 30, 1940

2,209,663

UNITED STATES PATENT OFFICE 2,209,663

CONTAINER

Frederick P. Riedel, Richmond Hill, N. Y.

Application June 17, 1938, Serial No. 214,191

1 Claim. (Cl. 220—1)

The invention relates to containers and more particularly to metallic containers commonly referred to as cans for carbonated liquids and more particularly fermented beverages such as beers, ales, and the like. The invention contemplates primarily the provision of a metallic container or can constructed in a novel manner to maintain the quality of the contents, such as beers and ales, at a substantially constant point and to prevent changes therein which decrease the market value of said contents. The invention has for its further object the provision of a container of the indicated class which is proof against structural changes resulting for instance from temperature variations and which may injuriously effect for instance the seams of such containers, and which enable the latter to be readily stored and stacked particularly in restricted spaces for instance in refrigerators. Other more specific objects will appear from the description hereinafter and the features of novelty will be pointed out in the claim.

In the accompanying drawing which illustrates an example of the invention without defining its limits, Fig. 1 is a plan view of the novel container; Fig. 2 is a sectional elevation thereof on the line 2—2 of Fig. 1; Fig. 3 is a similar view on the line 3—3 of Fig. 1, and Fig. 4 is an inverted sectional elevation of the container subsequent to the introduction of the contents and indicating a stage in the operation of combining the bottom with the body.

The novel container in the illustrated example is of the type designed to contain beer, ale and the like, and comprises the hollow body 5 of conventional cylindrical form dimensioned to have any customary capacity and made as usual of suitable metal in any well-known way. The body 5 preferably is provided with an interior lining 6 combined therewith in any conventional manner, and consisting of any material which is customarily utilized for this purpose such as suitable lacquer, wax, or the like.

The top or cover 7 of the container is attached throughout its periphery to one end of the body 5 in any well-known manner to seal the same and provide a fluid tight connection, as for instance by being crimped in place. For the purpose to be more clearly set forth hereinafter, the top or cover 7 is depressed into the body 5 as for instance by being curved inwardly from its periphery as illustrated in Figs. 2, 3, and 4. A top or cover 7 of inwardly depressed form such as shown in the selected example, is difficult to cut with existing types of openers conventionally utilized to provide openings through which the contents of such containers when used for beers, ales, and the like, may be poured for consumption. To overcome such difficulty, the depressed top or cover 7 is provided with an integral raised section of predetermined dimensions and preferably of triangular shape, and including an upper solid surface 9 adapted to be cut away by the aforesaid conventional opener or equivalent implement to provide the above-mentioned pouring opening. In order to avoid interference with the stacking or storage of the novel containers, the raised section 8 is dimensioned and located so as not to project inwardly beyond the normal upper end of the container, and so that the upper surface 9 is not located outwardly beyond said upper end. In the preferred arrangement, the surface 9 is located at a level below said normal upper end of the container as illustrated by way of example in the drawing.

While the aforesaid novel top or cover 7 and its associated elements may be combined with a container having any type of bottom, it is preferred to provide a bottom 10 which also is depressed inwardly into the body 5, and preferably is inwardly curved from its periphery as shown in Figs. 2 and 3. The bottom 10 may be attached to the other end of the body 5 in any practical manner, to seal the same and provide a fluid tight connection, as for instance by being crimped in place in the well-known way.

In practice, the container may be constructed and the parts thereof may be combined with each other in any sequence and in any typical manner. The lining 6 likewise may be applied to the interior of the body in any conventional way as by spraying, at any suitable stage in the production of said container; it will be understood that the top or cover 7 and the bottom 10 are also provided with a lining such as the lining 6. Preferably the top or cover 7 is attached to the one end of the body 5 to seal the same in a fluid tight manner prior to the introduction of the contents such as beer or ale, into said body 5.

In order to simplify the description, the latter will be directed to containers designed primarily to contain beer, ale, or the like, for which said containers are specially adapted.

When the container is ready to receive its contents, the beer, ale, or the like, is introduced by conventional methods into the inverted body 5 through the normal lower end thereof, which is still open at this stage. Subsequent to the aforesaid introduction of said contents into the body 5, the operation of attaching the bottom 10 to the other or normal lower end of the body 5 to seal the same in a fluid tight manner, is carried out. At a stage in this operation, prior to the final connection of the bottom 10 with the body 5, as illustrated diagrammatically in Fig. 4, a jet of carbonic acid gas is introduced into the body 5 to remove therefrom the air contained in said body above the level of the beer or other contents therein. The action of the introduced fluid jet to expel the aforesaid air from the body 5 is materially assisted by the bottom 10 which, because of its curved or other depressed form, serves to deflect this air outwardly from the body 5 under the impelling force of said fluid jet. The removal of the air is thereby greatly facilitated and the quantity of air trapped in the body 5 is reduced to a minimum. The attachment of the bottom 10 is completed in proper timing with the aforesaid operations, for instance, by crimping the peripheral edge of said bottom 10 in place on said body 5 in any conventional way. As the bottom 10 approaches its final position on the body 5, the depressed form of said bottom 10 will cause it to force any foam or the like which may have collected on the beer, ale or the like, out of the body 5.

Containers of the type in question generally have an interior capacity greater than the quantity of beer, ale, or the like, which the containers are designed to receive, so that a space will exist above the top of the fluid contents of a given container when the latter occupies a normal upright position. It will be understood that a space is necessary interiorly of the filled container in order to allow for expansion of the contents as a result of temperature variations such as occur for instance when the contents of the container are being pasteurized.

Assuming that beer constitutes the contents of the container, the aforesaid expansion will cause the beer to give up carbonic acid gas, and to re-absorb the same when contraction takes place; furthermore, the beer also absorbs air which may be present in the aforesaid space interiorly of the container. Repeated changes of the indicated character resulting from temperature variations to which the containers may be subject over a given period brings the colloidal system inherent in the beer out of balance and develops cloudiness therein, and thereby materially decreases the market value of the beer.

To obviate the aforesaid objectionable features or at least to materially minimize the same, the free surface area of the beer or other contents of the container is reduced to a minimum, instead of corresponding in extent to the internal cross-sectional area of the body as is the case in existing flat top containers of the class referred to; at the same time provision is made for expansion of the contents.

The novel and advantageous result is obtained by means of the inwardly depressed top or cover 7 which dips into the beer or other contents when the container is in a normal upright position as shown in Figs. 1 and 2; it will be understood that the parts are dimensioned and arranged to produce this result when the container is filled with the predetermined quantity of beer for which it is designed. As a result, the free surface area of the beer, in the upright position of the container, is in the form of a relatively narrow annulus $a$ surrounding the depressed top or cover 7 within the body 5 and provides a reduced surface whereby the area available for absorption will be of minimum dimensions, as shown in Figs. 2 and 3. At the same time, sufficient space is provided adjacent said annulus $a$ to permit the beer or other contents of the container to expand therein as said container is subjected to temperature variations of one kind or another.

In addition to its other functions, the inwardly depressed top or cover 7 in co-operation with the inwardly depressed bottom 10 provides maximum stability against pressure strains resulting for instance from pasteurization and barometric changes with the head space of less capacity than is required in existing flat top containers; this stability at the same time avoids the possibility of injury to the lining 6, such as cracks or flaws through which the beer or other contents might have access to the bare metal of which the body 5, top or cover 7, and bottom 10 are made.

As has previously been stated herein, the container is filled through its normal lower end, and the depressed bottom 10 at a stage in the operation of attaching it to the body 5 serves efficiently to deflect air contained in said body 5 out of said body under the impelling action of a jet of carbonic acid which is directed into said container into the space above the contents prior to the final sealing of said container; as mentioned hereinbefore, the bottom 10 because of its depressed form also forces foam and the like from the body. The amount of air, foam and the like which is trapped in the sealed container is thus reduced to a minimum, if not entirely eliminated.

The novel container may readily be opened at will as for instance by means of a conventional opener which may be readily used in the well-known way on the section 8 of the top or cover 7 to cut an opening, generally of triangular shape, in the solid surface 9 through which the contents of the container may be poured for consumption and use. The arrangement is such that the contents of the container develop no tendency to flow through said pouring opening into the inwardly depressed top or cover 7 while the container remains in an upright position. Containers embodying the novel features are easily stacked in superimposed relation or arranged in end to end relation in any other way, and accordingly may be efficiently stored or accommodated in relatively large number in restricted spaces such as exemplified by the interiors of refrigerators. The containers set forth herein are capable of being produced economically and without the need for complicated, specially constructed machinery, and in addition to the novel features referred to herein, possess all the advantages inherent in existing containers of the indicated class. In addition to serving efficiently as containers for beers, ales and the like, the novel containers may be used with equal efficiency for all kinds of fermented beverages.

Various changes in the specific forms shown and described may be made within the scope of the claim without departing from the spirit of the invention.

I claim:

A container of the kind described comprising a cylindrical hollow body, said hollow body having an inwardly curved bottom at one end and an inwardly curved cover at the other end sealing the container to diminish the internal air space therein and to resist any internal pressures developed in said body, said inwardly depressed cover having an outwardly raised portion forming a flat surface, said raised portion being substantially sector-shaped and less than 90°, and being a solid wall integral with said circular cover, and said sector-shaped flat portion of the cover being adapted to be cut away by an opener to provide a pouring opening.

FREDERICK P. RIEDEL.